United States Patent [19]

Berger et al.

[11] 3,984,130

[45] Oct. 5, 1976

[54] PIPE JOINT FOR AN INTERMEDIATE METAL CONDUIT

[75] Inventors: Sidney Berger, Great Neck; Salvatore Buda, East Hills; Burton Weintraub, Old Bethpage, all of N.Y.

[73] Assignee: Berger Industries, Inc., Maspeth, N.Y.

[22] Filed: Mar. 17, 1975

[21] Appl. No.: 559,019

[52] U.S. Cl. ............................. 285/31; 285/111; 285/175; 285/354; 285/388
[51] Int. Cl.² ...................................... F16L 17/02
[58] Field of Search ............... 285/388, 387, 31, 32, 285/354, 277, 12, 386, 389, 175, 111, 276, 12, 340, 333

[56] References Cited
UNITED STATES PATENTS

| | | | |
|---|---|---|---|
| 459,910 | 9/1891 | Hogan | 285/388 |
| 631,661 | 8/1899 | Perry | 285/31 |
| 658,692 | 9/1900 | Williams | 285/386 X |
| 798,078 | 8/1905 | Simpson | 285/388 |
| 1,703,696 | 2/1929 | Stratford | 285/388 |
| 1,771,949 | 7/1930 | Blanchard | 285/276 |
| 2,298,117 | 10/1942 | Franck | 285/388 X |
| 2,480,174 | 8/1949 | Yost | 285/388 X |
| 2,532,669 | 12/1950 | Jones | 285/354 X |
| 3,544,281 | 12/1970 | Phillips | 285/340 |

FOREIGN PATENTS OR APPLICATIONS

| | | | |
|---|---|---|---|
| 788,718 | 8/1935 | France | 285/12 |
| 202,253 | 2/1966 | Sweden | 285/354 |
| 413,027 | 7/1934 | United Kingdom | 285/333 |

*Primary Examiner*—Thomas F. Callaghan
*Attorney, Agent, or Firm*—Kirschstein, Kirschstein, Ottinger & Frank

[57] ABSTRACT

Each section of an intermediate metal conduit with a constant diameter axial passageway has male pipe threads formed on its outer wall surface at one end. The other end of each conduit section has a short length of decreased outside diameter extending axially inwardly from the flat end face of the section, to form an external annular stop shoulder. A coupling sleeve has a pair of annular flanges which define central openings in mutual axial alignment but of different diameters such that the coupling sleeve may slide freely to a limited extent over the full external diameter of said other end of the conduit section. The coupling sleeve is retained captively on this other end by a resilent constrictable lock ring positioned in an annular lock ring groove disposed axially inwardly of the stop shoulder. When the coupling ring is unstressed, it protrudes, in part, radially outwardly of the groove and is in the path of movement of one of the flanges. The coupling sleeve can be retracted, i.e., moved axially inwardly, until the other flange, this being female threaded, abuts the stop shoulder. The axial extent of the short length of decreased outside diameter is such that when said other flange abuts the stop shoulder the end face of the coupling ring does not project beyond, e.g., is flush with, the associated end face of the conduit section.

Assembly of conduit sections can be achieved without having to rotate either section. The end face of the threaded end of a first conduit section is butted against the end face of a reduced outside diameter end of a second conduit section. The coupling sleeve is screwed on to the threaded end until the one flange presses against the lock ring, causing the flat end juxtaposed faces of the two conduit sections to be pressed together with considerable force thereby forming a tight joint. Additional sealing means may be provided to ensure that the joint will be leak-proof. To disassemble previously assembled sections, consecutive coupling sleeves are backed off the threaded ends of adjacent conduit sections so that the end faces of the coupling sleeves are flush with the end faces of the associated conduit sections, permitting a section to be moved transversely away from a run of conduit without relative longitudinal displacement of adjacent conduit sections.

10 Claims, 12 Drawing Figures

PIPE JOINT FOR AN INTERMEDIATE METAL CONDUIT

BACKGROUND OF THE INVENTION

1. Field of the Invention

The invention relates to a joint for an intermediate metal conduit, and, more particularly, to a joint wherein sections are assembled by using a coupling ring which will permit sections to swivel with respect to one another during coupling and to be disassembled without axial longitudinal displacement of the conduit sections.

2. Prior Art

Until very recently, there were on the market only two kinds of steel conduit for electrical cables; one of these was called rigid pipe and the other was called light walled conduit.

The rigid pipe has been available for over one hundred years. It is a thick walled pipe that is conventionally used for the transmissions of gas and water. It also is used for sheathing electric wires in buildings in which case it is frequently embedded in concrete. As a sheathing for electrical cables, rigid pipe is used where the pipe has to be very strong, or where the pipe may be subjected to a heavy or sudden shock load. This type of pipe comes in various lengths, depending upon the trade but is essentially from ten feet to twenty feet long.

Rigid pipe sections are connected by screw couplings. Each end of a pipe section has tapered male threads formed thereon. These threads are V-shaped to standardized dimensions having a slightly flattened crest and a slightly flattened base. Each end of a screw coupling has tapered female pipe threads which mesh with the male pipe threads. The mesh is quite good and because the threads are tapered, when they are joined they make a joint that is essentially hermetic, that is, a joint that does not require sealing agents such as mastic or pipe compound, although sealing agents may be used.

The difficulties associated with the use of rigid pipe become apparent when such pipe is to act as a conduit for electric cables. Because the pipe is thick walled, each section is highly priced. In addition, each section is difficult to handle because of its weight. Because the pipe ends are threaded, each section must be rotated in the field when it is connected to another length of pipe. The weight of the pipe section makes the rotation difficult. Another drawback is that, if a section of pipe or a fitting is damaged, either the pipe or fitting has to be cut to eliminate the same and replaced, or the entire layout must be unscrewed piece by piece until the damaged section or fitting is removed.

Moreover, since the screw couplings must mesh with male threads on adjacent pipe sections, the sections must be in perfect axial alignment or the threads will not mesh properly. As is often the case in field installations, or where replacements must be made to existing pipe systems, the pipe sections are not in perfect alignment and problems result in assembling the sections. A further difficulty is the fabrication cost involved because of the wall thickness.

The other kind of conduit which has been developed for sheathing electrical cables is light walled conduit. Light walled conduit was designed solely as a conduit for encasing electric cables to protect them from damage. Because it does not have to take large stresses, it is thin walled. Obviously, an advantage of light walled conduit is its lighter weight and its lower cost.

A disadvantage is that it cannot be used in instances where it might be subjected to heavy loads. In addition, because of its thin wall, this type of conduit can not be threaded. Compression couplings are used most often to join sections of light walled conduit. The ensuing joint cannot withstand substantial internal pressure or tensile stress. The advantage of compression couplings over the screw couplings used in conjunction with the rigid pipe is that if any section of tubing or any fitting is damaged, the coupling can be opened and the damaged pipe section or fitting can be pulled out transversely without removing the fittings or sections that were not damaged.

Recently, due to the scarcity of and resulting higher prices for steel, a medium walled pipe known as utility pipe or intermediate metal conduit was developed having a wall thickness less than the wall thickness of the rigid pipe but greater than the wall thickness of the light walled conduit. This intermediate metal conduit is heavy enough to take intensive loads and can be hermetically sealed at the joints.

Intermediate metal conduit has used screw couplings for joints, causing the same problems to arise in connection with this conduit as with the rigid pipe namely, the necessity of rotating conduit sections to make up joints or the necessity of unscrewing the sections one after another from an end of a run of pipe when an intermediate section or fitting is to be removed. Further the axial alignment problem inherent in the rigid pipe system is also present. It is toward elimination of these difficulties with intermediate metal conduit that the present invention is directed.

SUMMARY OF THE INVENTION

1. Purposes of the Invention

It is an object of the present invention to provide an intermediate metal conduit joint providing a substantially hermetic joint between two sections of conduit.

Another object of the present invention is to provide an intermediate conduit joint in which the coupling is captively attached to the conduit section.

A further object of the present invention is to provide a joint for intermediate metal conduit wherein the coupling permits some swivelling movement between lengths as they are joined.

Yet another object of the present invention is to provide a joint for intermediate metal conduit which will permit shortening of lengths of conduit in the field for accomodation of existing spatial requirements.

A still further object of the present invention is to provide a joint for intermediate metal conduit which will permit removal of individual lengths without axially displacing adjacent conduit sections or disassembling the system from one end to a point where replacement of a section or fitting is to be accomplished.

Other objects of the invention in part will be obvious and in part will be apparent in the following description.

2. Brief Description of the Invention

Generally speaking, identical first and second conduit sections having constant diameter axial passageways are joined by means of a coupling sleeve which is mounted captively on a non-threaded end of the first conduit section, being freely rotatable thereon and axially slidable to a limited extent. This end has a length of reduced outside diameter extending axially inwardly from the end face of the first conduit section to create a stop shoulder in the outer wall surface. An annular lock ring groove in the outer wall surface is spaced inwardly from the stop shoulder. A resilient constrictable lock ring is located within the annular lock ring groove. In its normal unbiased condition the lock ring partially projects from the annular lock ring groove above the outer wall surface. The coupling sleeve has a pair of inwardly extending flanges, one at each end with an internal annular clearance formed therebetween. The flanges form central openings in mutual axial alignment but having different diameters. The first flange defines an opening slightly greater in diameter than the unreduced outer wall surface. The second flange defines a central opening which is slightly greater in diameter than the diameter of the reduced outside diameter length. The axially inward surface of the first flange and the axially outward surface of the lock ring are so mutually formed, e.g., by the provision of a camming slope on one or both of them, that when the coupling sleeve is forced axially inwardly along the non-threaded end of the conduit section, the camming slope causes the lock ring to be constricted and thereby forced fully into the annular lock ring groove so that the first flange rides over the lock ring. After the first flange passes over the lock ring, the lock ring returns to its normal unbiased condition and at this time protrudes partially into the annular clearance of the coupling sleeve. The second section has male threads formed in its outer wall surface. To assemble the conduit sections, flat end faces of the sections, one at the unthreaded end and the other at the threaded end, are butted together. The coupling sleeve is then screwed on to the threaded end until the first flange presses against the lock ring, forcing the two end faces together under considerable stress to form a tight joint.

The axially outward surface of the first flange and the axially inward surface of the lock ring are so mutually formed that the application of a force tending to pull the coupling sleeve off the associated conduit section will not exert a radially inward constrictive force on the lock ring. Conveniently this is accomplished by making the axially outward surface of the first flange flat and perpendicular to the longitudinal axis of the conduit section or having the same slope radially outwardly in a direction away from the second flange and by making the axially inward surface of the lock ring flat and perpendicular to the longitudinal axis of the conduit section, or, if this surface of the lock ring is curved, by having the crest of the curve above the radially inner surface of the first flange.

Because of the slight clearance between the first flange and the conduit section, two adjacent conduit sections may be slightly out of axial alignment without interfering with engagement between the coupling sleeve and the threaded end of the section on which it is to be screwed.

To disassemble the sections, the coupling sleeve is unthreaded from the adjacent conduit section and retracted axially inwardly until the second flange abuts the stop shoulder, in which position the end face of the coupling sleeve will be flush with the end face of the conduit section to allow either conduit section to be laterally displaced without any longitudinal movement relative to the other conduit section.

The invention consists in the features of construction and arrangement of parts which will be detailed hereinafter and described in the appended claims.

BRIEF DESCRIPTION OF THE DRAWINGS

For a better understanding of the above invention reference should be had to the accompanying drawings wherein like numerals of reference indicate similar parts throughout the several views and wherein.

DESCRIPTION OF THE PREFERRED EMBODIMENT

Figure 1:
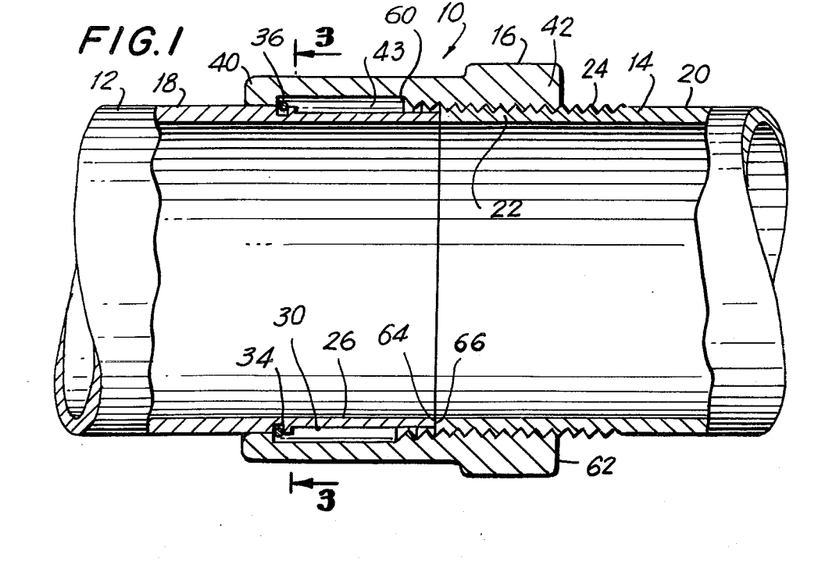
FIG. 1 is a sectional axis view of two assembled conduit sections embodying the present invention.
Figure 2:
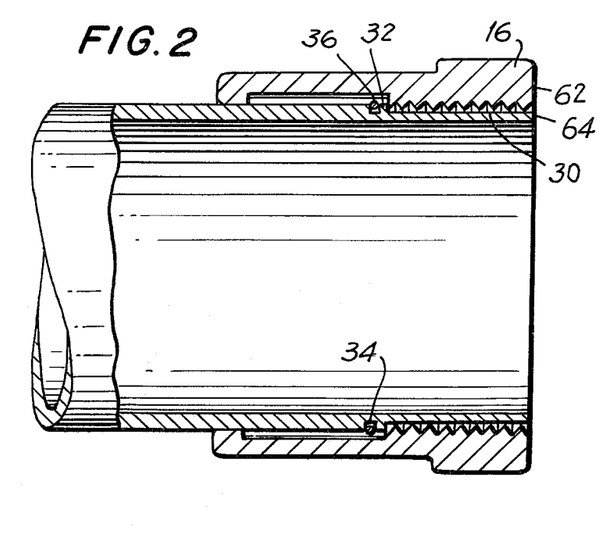
FIG. 2 is a sectional axial view of a conduit section with the coupling sleeve in its fully retracted position.
Figure 3:
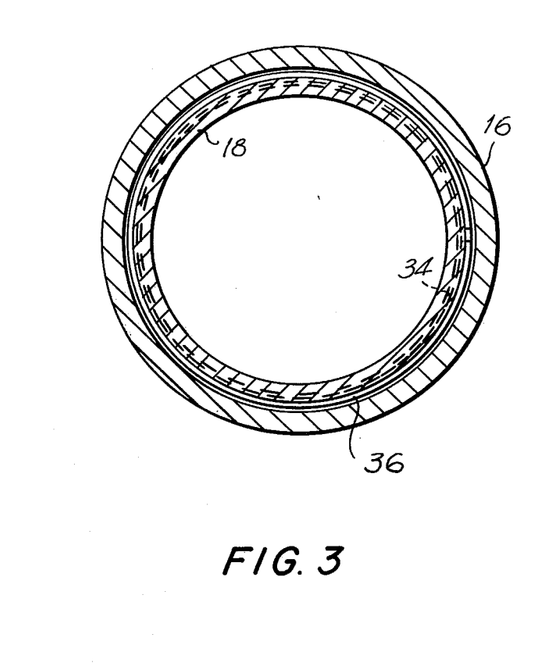
FIG. 3 is a sectional view taken substantially along the line 3—3 of FIG. 1.

With reference to FIGS. 1 and 2, a pipe joint for an intermediate metal conduit is identified generally by the reference numeral 10. It includes a first and a second intermediate metal conduit section 12 and 14, respectively, and a coupling sleeve 16 which is held captively on the end of section 12. The sections 12 and 14 are identical. The sections 12 and 14 have generally cylindrical outer wall surfaces 18 and 20, respectively, and each has a constant diameter axial passage therethrough. These sections typically are made of mild steel, wrought iron, a silicon bronze alloy or an aluminum alloy. As can be seen, the end portion 22 of the second section 14 has a tapered male pipe thread 24 formed in its outer wall surface 20.

While only a portion of each section of conduit is illustrated, it is to be understood that each section has one end on which is mounted a coupling sleeve in accordance with the present invention, and another end having male pipe threads formed therein.

In the specification and the claims, the term "axially inwardly" and "axially outwardly" are used with reference to the end face of the conduit section on which the coupling sleeve is retained, that is axially inwardly refers to a vector extending from that end face of the conduit section towards the other end face of the conduit section. Conversely, axially outwardly refers to a vector extending outwardly away from that end face.

The coupling sleeve 16 is free for rotation and for limited axial movement relative to the end 26 of the first section 12. As can be seen in FIGS. 1 and 2, a short length of reduced diameter 30 is selected to permit the coupling sleeve 16 to be retracted axially inwardly along the first section 12 at least far enough for the end face of the coupling sleeve 16 to be flush with the end face of the first section as will hereinafter be described in detail. An external annular lock ring groove 34 is provided and is spaced axially inwardly a short distance from the stop shoulder 32.

Figure 11:
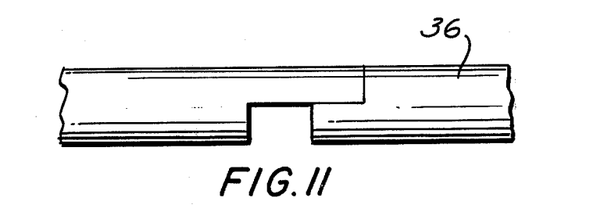
FIG. 11 is a fragmentary view of the lock ring at overlapping ends thereof.

With continued reference to FIGS. 1 and 2, a resilient constrictable metal lock ring 36 is contained within the annular lock ring groove 34, and in its normal (unstressed) position extends above the outer wall surface 18 (at least one-half of its height if of circular cross-section) for reasons which will become apparent as the description proceeds. The lock ring 36 is a split ring (as shown in FIG. 11) formed from spring steel or other suitable resilient alloy which can be expanded to slide over the conduit section and will snap into the groove 34. Thereupon, as the expanding force is removed, the ring will return to its normal configuration in which its inner diameter is less than the outer diameter of conduit sections and exceeds the diameter of the bottom of the annular groove by an amount sufficient to allow the ring to be fully received in the groove when the ring is constricted. While the lock ring is illustrated as being a ring with a circular cross-section, a ring of oblong or square section also may be employed (see FIG. 12).

The axially inward surface of the lock ring is such as to inhibit camming of the ring radially inwardly when an axially outwardly directed force is applied thereto. To this end, said surface may be flat and perpendicular to the longitudinal axis of the conduit section, as it will be if the ring is of rectangular cross-section, or said surface, if curved, will have the crest of the curve above the outer wall surface of the conduit section, as it will be if the ring is of round cross-section and projects beyond the groove 34 by more than one-half of the diameter of the cross-section.

Figure 7:
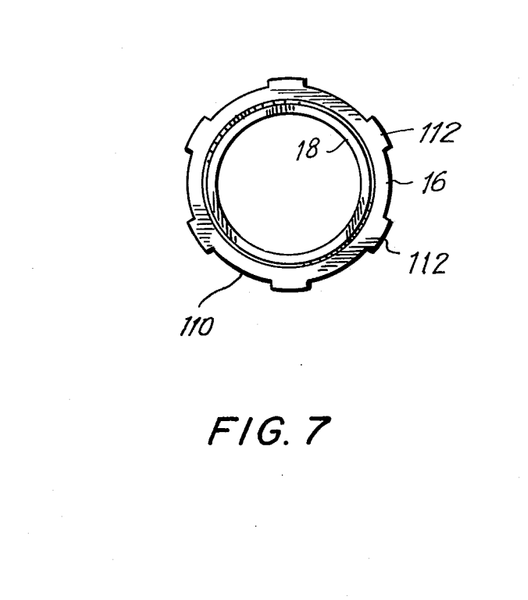
FIG. 7 is an end view of the intermediate metal conduit section at the end with the coupling sleeve mounted thereon.

The coupling sleeve in accordance with the present invention can be made of any suitable material such as steel, malleable iron, bronze, an aluminum alloy or a zinc die cast alloy. As shown in FIG. 7 the coupling sleeve 16 has an external circumference 110 (see FIG. 10) which is formed into a shape that enables it to be gripped by a torquing tool (not shown) such as a pipe wrench. The coupling sleeve may have radially outwardly extending projections 112 which provide bearing surfaces for torquing tools. It is to be understood that the particular configuration of the external circumference which enables the coupling sleeve to be gripped by torquing tools is well known in the art and does not form a part of this invention.

The coupling sleeve 16 has a first radially inwardly extending flange 40 at one end thereof and a second radially inwardly extending flange 42 at the other end thereof which define central openings of different diameters that are in axial alignment. The first flange 40 defines an opening slightly greater in diameter than that of the outer wall surface 18. The second flange 42 defines a central opening which is less in diameter than the diameter of the outer wall surface 18 but which is slightly greater than the diameter of the reduced diameter length 30. Between the flanges 40 and 42 there is an axial annular central groove 43 having a greater diameter then that of the first flange 40 thereby to create an annular clearance. A female machine thread is formed in the second flange 42. The female machine thread is dimensioned to mesh initially with the male pipe thread 24; however, since the male thread is tapered and the female thread is not, when said threads are mated and tightened, they eventually will jam. The coupling ring 16 can be slipped on to the end 26 of the conduit section 12. It is the interaction of the first and second flanges 40 and 42 with the lock ring 36 and the stop shoulder 32, respectively, which captively retains the coupling ring 16 on the unthreaded end 26 of the conduit section.

The axially outward surface of the first flange is so configured as to inhibit camming of the lock ring radially inwardly when said surface is disposed axially inwardly of the lock ring and is being pulled axially outwardly. For this purpose, said surface may be flat and perpendicular to the longitudinal axis of the conduit section or slope radially outwardly in a direction away from the second flange.

Figure 4:
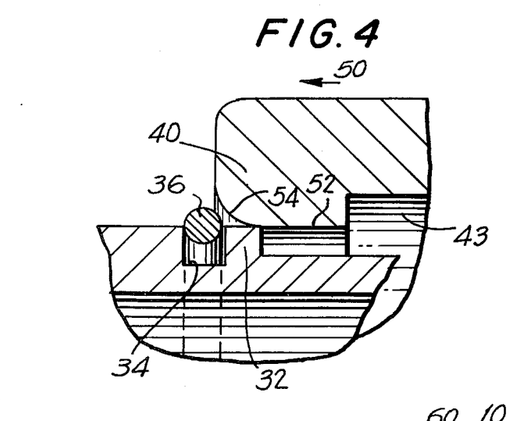
FIG. 4 is a highly enlarged fragmentary longitudinal sectional view showing the position of the coupling sleeve and lock ring when the coupling sleeve first is placed on the conduit section and slid along the section up to the lock ring.
Figure 5:
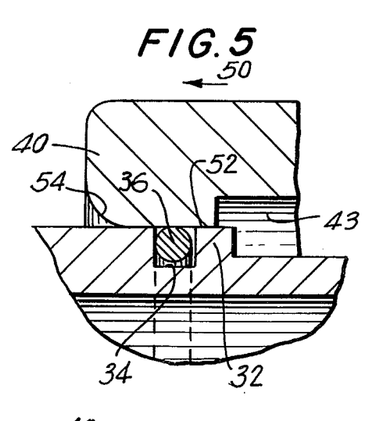
FIGS. 5 and 6 are fragmentary sectional longitudinal views similar to FIG. 4, but showing the sequential positions of the coupling sleeve and lock ring as the coupling ring is moved axially inwardly on the conduit section.
Figure 6:
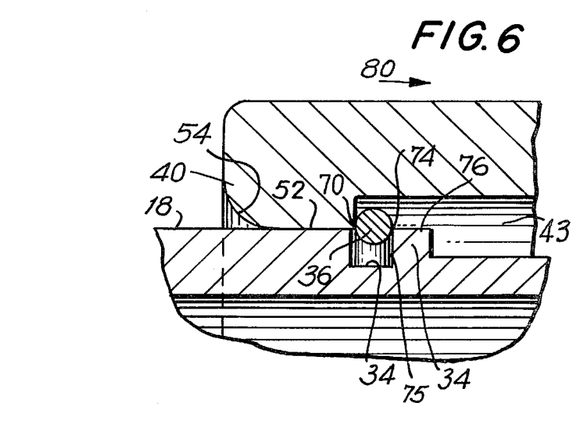

With reference to FIGS. 4, 5, 6, there is shown in sequential steps the cooperation of the first flange 40 with the lock ring 36 as the coupling sleeve is mounted on the conduit section. When the coupling sleeve 16 is first slipped onto the conduit section 12 in the direction of arrow 50 the radially inward face 52 of the first flange 40 clears the stop shoulder 32. The first flange 40 has a camming surface 54 which engages the lock ring 36. As mentioned hereinabove, the lock ring 36 can be forced inwardly or constricted into the annular lock ring groove 34. As the coupling sleeve 16 is moved further inwardly the camming surface 54 drives the lock ring 36 into the annular lock ring groove 34. The lock ring 36 is held in the groove by the face 52 as said face passes over the lock ring. Once the first flange 40 clears the lock ring, the lock ring expands into the annular clearance 43 and returns to its normal position as shown in FIG. 6. The coupling sleeve is prevented from moving axially outwardly but can still be moved axially inwardly until the inner wall 60 of the second flange 42 abuts the stop shoulder 32. The axial extent of reduced diameter length 30 is equal to at least the width of the second flange 42 so that when the inner wall 60 abuts the stop shoulder 32 the end face 62 of the coupling sleeve 16 is at least flush with the flat end face 64 of the unthreaded conduit section 12, as shown in FIG. 2, for reasons which will hereinafter become apparent.

The aforesaid radially inward constrictive force exerted on the lock ring 36 has been described as being generated by the camming surface 54 on the axially inward face of the first flange 40. The same effect is achieved by providing, alternately, or additionally, a camming surface on the axially outward surface of the lock ring.

To assemble the first and second conduit sections, the first section 12 is brought into axial alignment with the second section 14 and its flat end face 66 at its unthreaded end butted against the flat end face 64 at the threaded end of section 14. The inner edges of the end faces 64 and 66 preferably are slightly chamfered or beveled to remove burrs. The coupling sleeve then is threaded onto the end 22 until the corner 70 formed by the inner wall 72 and the face 52 of flange 40 engages the lock ring 36. As an effort is made to tighten the coupling sleeve 16 further along the end 22 an axially outwardly directed force 80 (shown in FIG. 6) is created. As the corner 70 is forced against the lock ring 36, the lock ring is pressed against the corner 74 formed by surface 18 and the side wall 75 of the annular lock ring groove. Since at least half of the diameter of the cross-section of the lock ring extends beyond the outer wall surface 18, or because the lock ring is of rectangular cross-section, if that be the case, the lock ring will not be cammed inwardly into the groove, but said force will be transmitted to the end face 66 of the conduit section 12, causing said face to be squeezed against the juxtaposed end face 64 of the conduit section 14. The tapered male thread 24 is so dimensioned relative to the female thread of the second flange 42 that said threads start to jam but have not fully jammed when the desired squeezing pressure has been developed at the abutment between the juxtaposed pipe ends 64, 66. With the adjoining sections thus coupled the axial pasageways thereof are in axial alignment and, except for the insignificant groove formed by the end bevels, the inner surfaces of the sections present an unbroken surface to electric cable being threaded through a run of conduit so that cable can be pulled through a run without snagging at joints.

The annular lock ring groove 34 is spaced from said stop shoulder 32 a sufficient distance such that the portion 76 of the outer wall can resist shear stresses that are caused by the axially outwardly directed force 80. Testing has shown that a coupling sleeve in accordance with the present invention can withstand any axially outwardly directed force that can be developed by torquing the sleeve with conventional assembly tools.

Because a male pipe thread on the end of section 14 is mating with a female machine thread on the coupling 16, a substantially hermetic joint is formed between the coupling sleeve 10 and the second conduit section 14.

Figure 12:
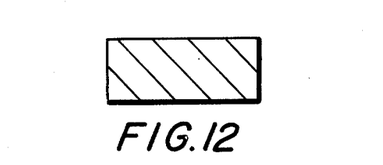
FIG. 12 is a cross-section through an alternate form of lock ring.

In FIG. 12 there is illustrated a lock ring 36' of rectangular cross-section such as has been mentioned heretofore. This ring functions in the same manner as the lock ring 36 of circular cross-section. However, it need not, although it can, extend at least one half of the thickness of this ring above the top of the lock ring groove when unstressed.

If, as is often the case in field installations, the sections to be joined are not in, or cannot be brought into, an axial alignment sufficiently good to join rigid pipe sections with a threaded coupling, the sections still may be joined with ease. The central opening formed by flanges 40 and 42 are slightly greater than the outer wall surface 18 and the reduced diameter area 30, respectively, so that there is a slight clearance of about 0.020 to 0.040 inch, on the diameter, between the flanges and the outer wall of the conduit. This clearance permits a slight swivelling of the coupling sleeve 16 on the end of section 12 up to about 1/2° away from the longitudinal axis of said section. Therefore, the female thread on the coupling sleeve can mate readily with the male thread on the end of an adjoining conduit section even if the sections are not in exact axial alignment. The end faces of the sections will not abut each other initially in this situation, but they will abut after the coupling sleeve is tightened and the sections flex slightly to accomodate the abutment.

When assembled sections of conduit are to be disassembled the coupling sleeve 16 is unthreaded from the end 22 and backed off until the inner wall 60 abuts the stop shoulder 32. As mentioned hereinabove, the end face 62 of the coupling sleeve 16 at this time will be at least flush with the end face 64 of the conduit section 12 (FIG. 2) so that either conduit section 12 or 14 can be displaced laterally without longitudinal movement relative to the other conduit section. Naturally the joint at both ends of a given conduit section will have to be opened (disassembled) in order to remove that section.

Figure 8:
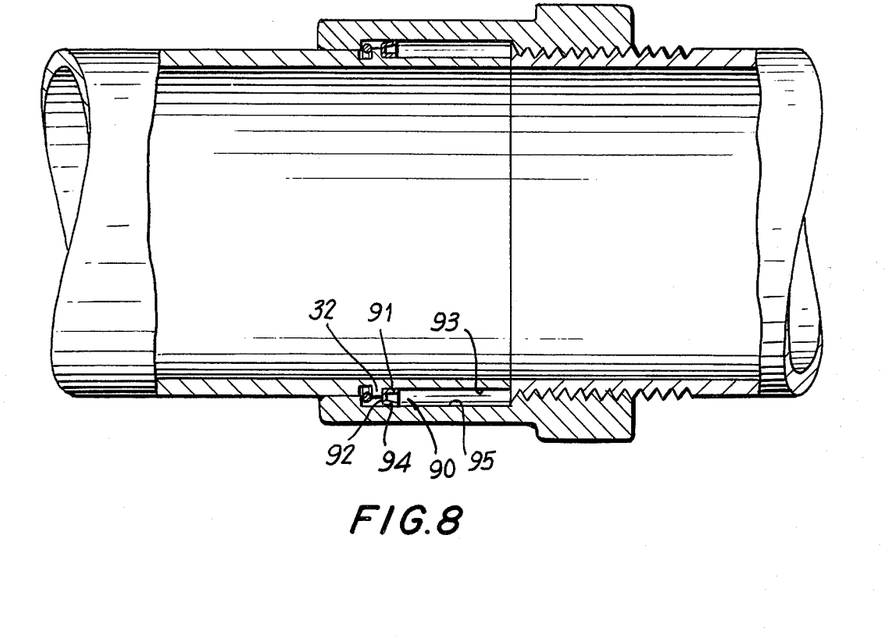
FIG. 8 is a view similar to FIG. 1, but showing the coupling sleeve provided with a seal.

While the joint in accordance with the present invention is essentially hermetic due to the appreciable force which squeezes the juxtaposed flat ends 64, 66 together and to the squareness of said ends to the longitudinal axis of the conduit sections, sealing means may be provided to further ensure that the joint will be leakproof. As shown in FIG. 8 an annular elastomeric seal ring 90 may be situated adjacent the stop shoulder 32 in the clearance between the length of reduced diameter 30 and the base of the groove 43. The seal 90 U-shaped and includes perpendicular legs 91 and 92 which abut the outer surface 93 of length 30 and the stop shoulder 32 respectively. An outwardly extending leg 94 contacts the inner surface 95 of the groove 43 to provide a barrier which prevents water leakage between the first flange 40 and the outer wall surface 18.

Figure 10:
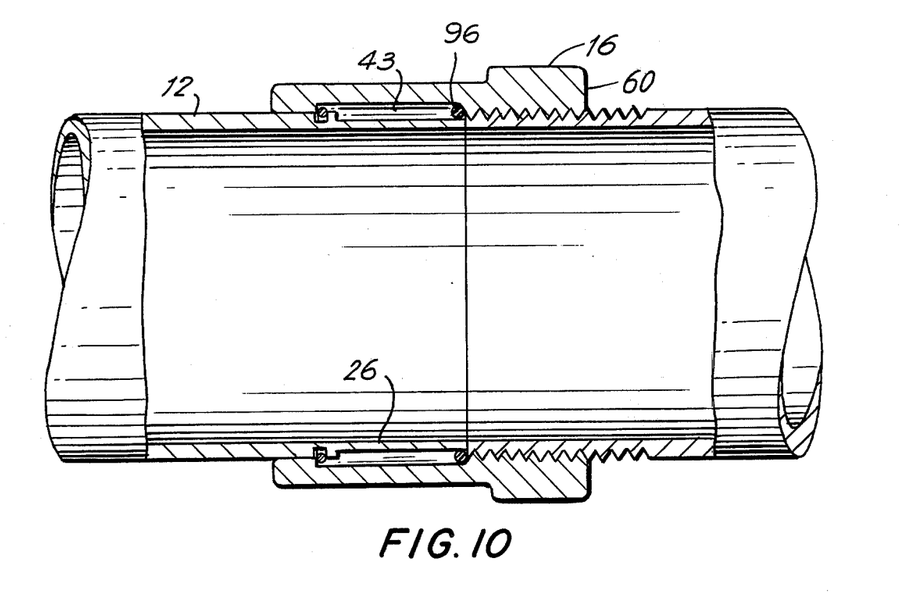
FIG. 10 is another view similar to FIG. 1, but showing another sealing arrangement.

An alternative seal construction is shown in FIG. 10 wherein a sealing elastomeric O-ring 96 is tight on the length 30 and bears against the base of groove 43.

If either of the sealing means just described is used, the axial length of the reduced diameter portion is equal to the combined width of the second flange 42 and the sealing ring so that the end face 62 of the coupling sleeve 16 will be flush with the flat face 64 of the conduit section 12 as herein above described.

Figure 9:
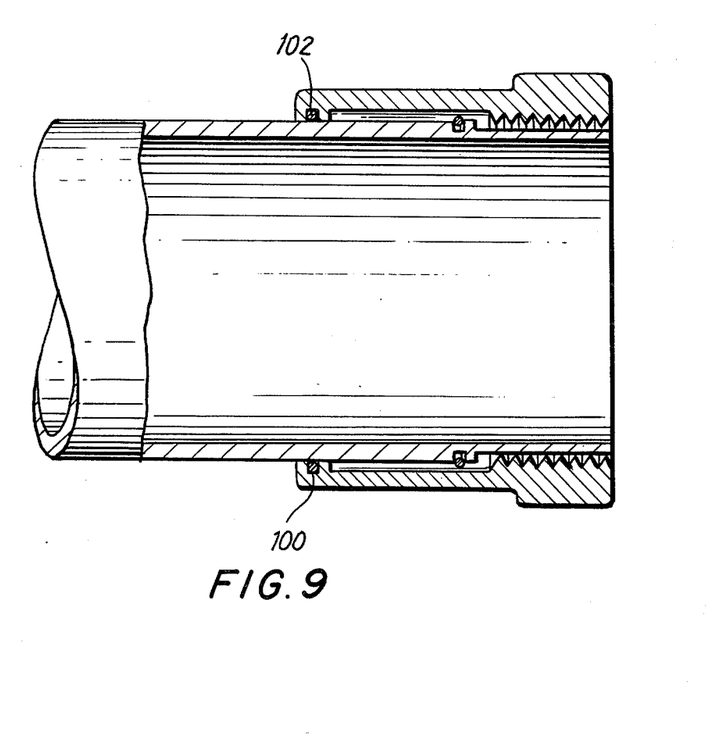
FIG. 9 is a view similar to FIG. 8, but showing an alternative seal.

Another form of sealing means is shown in FIG. 9 wherein an annular groove 100 is formed on the inner surface of the first flange 40. An elastomeric sealing O-ring 102 is positioned therein, tight on the conduit section. This will prevent water from passing between the face 52 of flange 40 and the outer wall surface 18.

It can be seen from the foregoing detailed description that the object of the present invention, namely to create an improved joint for intermediate metal conduit sections, has been achieved by providing a coupling sleeve captively retained on one end of a first conduit section. The coupling sleeve is captively retained by the interaction of a pair of flanges on the coupling sleeve and a lock ring and stop shoulder on the outer wall surface of the conduit section. A first flange defines a central opening slightly greater than the diameter of the outer wall surface of the conduit section. A second flange at the other end of the coupling sleeve defines a central opening in axial alignment with the central opening formed by the first flange, being, however, smaller in diameter then the central opening of the first flange and cooperating with a length of reduced outer diameter of the conduit section extending axially inwardly from the end face of said section to the stop shoulder. To assemble two sections of conduit, the end of a second conduit section having external threads formed therein is abutted against the end of the first conduit section having a coupling sleeve thereon. The coupling sleeve is then threaded on to the end portion until the first flange presses against the lock ring in order to force the ends of the two sections against one another. The first flange and cooperating face of the lock ring have cooperating camming surfaces. The second flange and cooperating face of the lock ring have cooperating non-camming surfaces. To disassemble the conduit sections the coupling sleeve is backed off the end of the adjacent conduit section until the second flange abuts the stop shoulder in which position the end face of the coupling sleeve will be at least flush with the end face of the conduit section, permitting one conduit section to be moved laterally without moving either conduit section longitudinally along its axis.

What is claimed is:

1. In combination:
   a. a first two ended conduit section with a circular cylindrical outer wall surface and an axial passage of constant cross-sectional dimensions and configuration, one end of said first conduit section having external thread means thereon and a flat substantially perpendicular end face and said other end of said first conduit section being non-threaded and having a flat substantially perpendicular end face;
   b. a second two ended conduit section identical to said first conduit section having a circular cylindrical outer wall surface equal in diameter to said outer wall surface of said first conduit section and an axial passage of constant cross-sectional dimensions and configuration equal to said axial passage through said first conduit section, one end of said second conduit section having external thread means thereon with a flat substantially perpendicular end face matching and abutting said adjacent flat substantially perpendicular end face of said other non-threaded end of said first conduit section and said other end of said second conduit section being non-threaded and having a flat substantially perpendicular end face;
   c. a coupling sleeve having an end face, said coupling sleeve including female thread means extending from adjacent said end face and constructed and dimensioned to engage said external thread means on said one end of said second conduit section;
   d. each of said conduit sections including a length of reduced outside diameter extending axially inwardly from said flat substantially perpendicular end face at said other end of said conduit section to form a stop shoulder in said outer wall surface at said non-threaded end;
   e. each of said conduit sections having means providing an annular lock ring groove in said outer wall surface near and spaced axially inwardly from said stop shoulder;
   f. a resilient lock ring of a constrictable diameter, said lock ring in its normal unbiased condition projecting in part above said outer wall surface and being constrictable entirely into said annular lock ring groove; and
   g. abutment means extending radially inwardly on said coupling sleeve adapted to cooperate with said stop shoulder and said projecting part of said lock ring to permit free rotation of said coupling sleeve on said first conduit section and limited axially inward and axially outward movement of said coupling sleeve along said non-threaded end of said first conduit section, said abutment means including first and second radially inwardly extending flanges at opposite ends of said coupling sleeve, said second flange having said female thread means, said first flange defining a central opening of a diameter slightly greater than the diameter of said outer wall surface, said second flange defining a central opening smaller than the diameter of said outer wall surface but slightly greater than the diameter of said area of reduced outside diameter, said central openings being in axial alignment so that said coupling sleeve may be slipped on to said other non-threaded end of said first conduit section;
   h. an axially extending annular clearance formed between said first and second flanges;
   i. at least one of said lock ring and a cooperating surface of said first flange having camming means to constrict said lock ring into said annular lock ring groove when said coupling sleeve is moved axially inwardly on said other end of said first conduit section;
   j. said lock ring returning to its normal unbiased condition in said annular clearance when said first flange clears said ring;
   k. a surface of said first flange and said lock ring having cooperating abutment means to prevent said lock ring from being forced radially inwardly entirely into said lock ring groove;
   l. so that said coupling sleeve is prevented from being pulled axially outwardly from said conduit section over said lock ring as said coupling sleeve is threaded onto said externally threaded end of said second conduit section so as to force said end faces of said first and second conduit sections together;
   m. said area of reduced outside diameter extending axially inwardly at least the width of said second flange so that said coupling sleeve may be backed off said externally threaded end of said second conduit section after said first and second conduit sections are assembled whereby said second flange will abut said stop shoulder and said end face of said coupling sleeve will be at least flush with said flat substantially perpendicular end face of said first conduit section to permit said first conduit section to be laterally displaced from said second conduit section without longitudinal movement of either conduit section.

2. A joint in accordance with claim 1 wherein one of said thread means is a pipe thread and the other of said thread means is a machine thread, said thread means meshing to form an hermetic seal, when said coupling sleeve is threaded on said end of said second conduit section.

3. A joint in accordance with claim 1 wherein the camming means is on the first flange.

4. A joint in accordance with claim 2 further including sealing means to prevent leakage of water between said coupling sleeve and said first conduit section.

5. A joint in accordance with claim 4 wherein said sealing means comprises:
   a. means providing an annular groove in said first flange, and;
   b. a sealing elastomeric O-ring in said annular groove and tight on said first conduit section.

6. A joint in accordance with claim 4 wherein said sealing means comprises an elastomeric annular member including:
   a. a pair of perpendicular sides, one of said sides engaging said stop shoulder and the other engaged said length of reduced outside diameter, and
   b. an outwardly extending leg extending from one of said sides and engaging said coupling sleeve.

7. A joint in accordance with claim 4 wherein said sealing means comprises a sealing ring mounted to said coupling sleeve within said annular clearance abutting said second flange.

8. The combination in accordance with claim 1 wherein said one resilient lock ring has a circular cross-section, said lock ring extending beyond said outer surface of said first conduit section at least one-half its cross-sectional height and the axially outward surface of said first flange is perpendicular to the longitudinal central axis of said conduit section so that said axially outward surface will abut said lock ring to prevent said lock ring from being forced inwardly into said annular lock ring groove and said coupling sleeve from being pulled axially outwardly from said first conduit section.

9. The combination in accordance with claim 1 wherein said one resilient lock ring has a rectangular cross-section and the axially outward surface of said first flange is perpendicular to the longitudinal central axis of said conduit section so that said axially outward surface will abut said lock ring to prevent said lock ring from being forced inwardly into said annular lock ring groove and said coupling sleeve from being pulled axially outwardly from said first conduit section.

10. The combination in accordance with claim 1 wherein said central opening defined by said first flange and said central opening defined by said second flange are dimensioned to create a clearance between said first flange and said outer wall surface and said second flange and said area of reduced outside diameter to permit swivelling of said coupling sleeve on said other non-threaded end of said first conduit section so that said female thread means on said second flange can mate with said external thread means on said one end of said second conduit section when said first and second conduit sections are not in exact axial alignment.

* * * * *